United States Patent [19]
Szydlo et al.

[11] Patent Number: 4,653,858
[45] Date of Patent: Mar. 31, 1987

[54] METHOD OF FABRICATION OF DIODE-TYPE CONTROL MATRICES FOR A FLAT ELECTROOPTICAL DISPLAY SCREEN AND A FLAT SCREEN CONSTRUCTED IN ACCORDANCE WITH SAID METHOD

[75] Inventors: Nicolas Szydlo, Limours; Jean N. Perbet, Gif Sur Yvette; Nicole Proust, Palaiseau, all of France

[73] Assignee: Thomson-CSF, Paris, France

[21] Appl. No.: 846,209

[22] Filed: Mar. 31, 1986

[30] Foreign Application Priority Data

Apr. 2, 1985 [FR] France ................... 85 05008

[51] Int. Cl.$^4$ .................... G02F 1/13; B44C 1/22; C03C 15/00; C23F 1/02
[52] U.S. Cl. ................... 350/332; 156/643; 156/652; 156/656; 156/657; 156/659.1; 156/662; 156/667
[58] Field of Search ........... 156/643, 652, 656, 657, 156/659.1, 662, 667; 350/330, 332, 333; 357/15, 30

[56] References Cited

U.S. PATENT DOCUMENTS 3,863,332  2/1975  Leupp et al. ............. 156/656 X
3,928,658  12/1975  Van Boxtel ............. 156/656 X

FOREIGN PATENT DOCUMENTS 0073705  3/1983  European Pat. Off. .
2551902  3/1983  France .
2548450  1/1985  France .
2091468  7/1982  United Kingdom .

OTHER PUBLICATIONS

IBM Technical Disclosure Bulletin, vol. 22, No. 1, Juin 1979, pp. 296-298, New York, U.S.; M. H. Brodsky, et al.: "Large-Area Dot-Matrix Liquid-Crystal Display Having Diodes Deposited on a Substrate".

Primary Examiner—William A. Powell
Attorney, Agent, or Firm—Oblon, Fisher, Spivak, McClelland & Maier

[57] ABSTRACT

Diode-type control matrix arrays for electrooptical flat-panel screens which find application in liquid-crystal displays are fabricated by depositing a layer of conductive material on a substrate and etching the control electrodes and control leads in this layer. The entire structure is then coated with an undoped amorphous semiconductor layer, with a doped amorphous semiconductor layer, and with a second layer of conductive material. In these three layers are etched terminal areas (or control elements) for connecting the control electrodes to the control leads.

9 Claims, 14 Drawing Figures

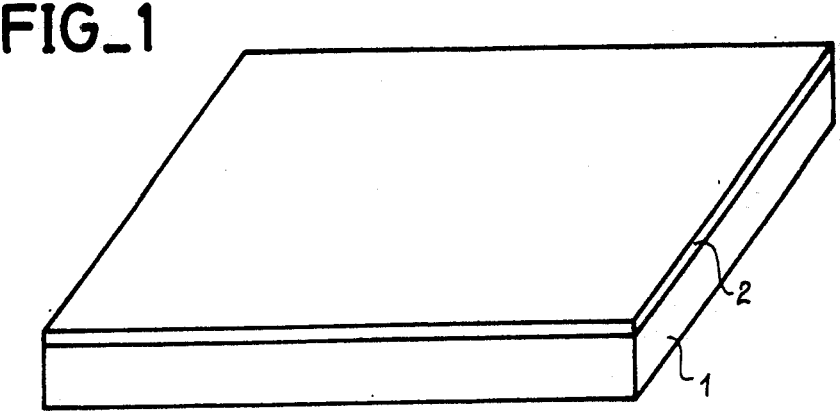
FIG_1
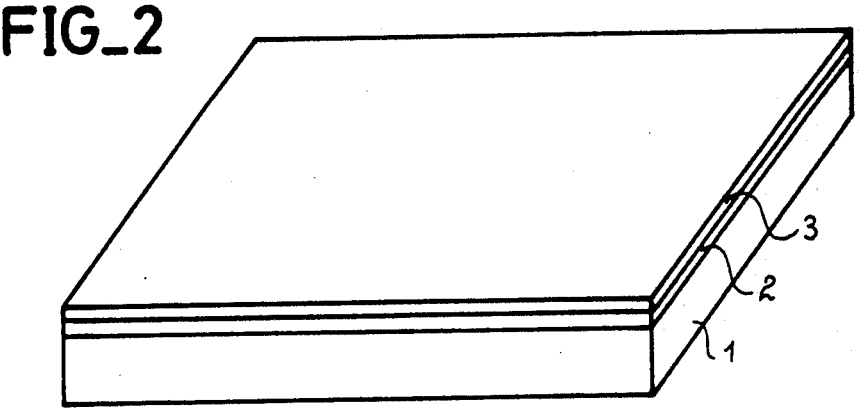
FIG_2
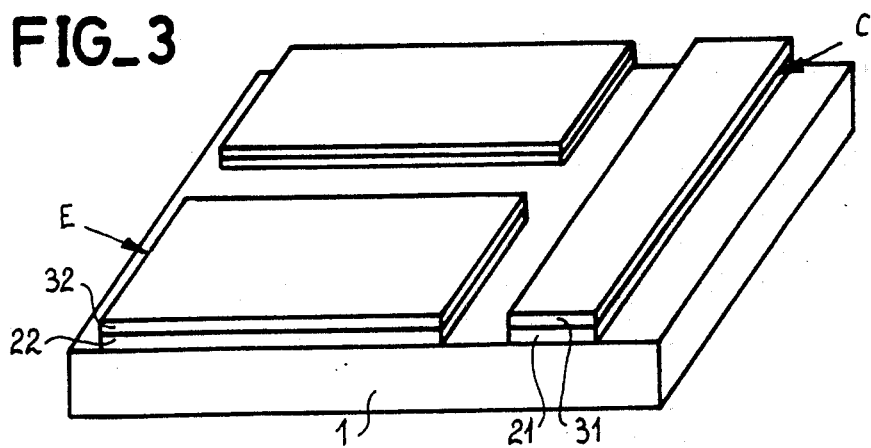
FIG_3

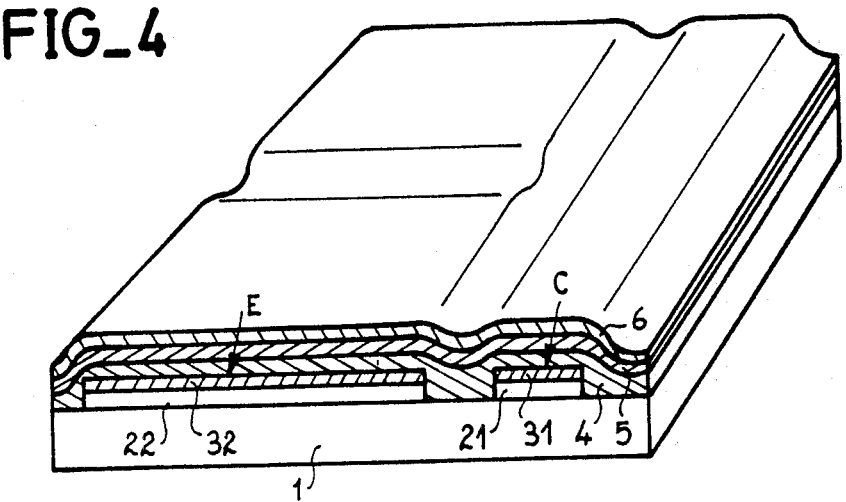
FIG_4
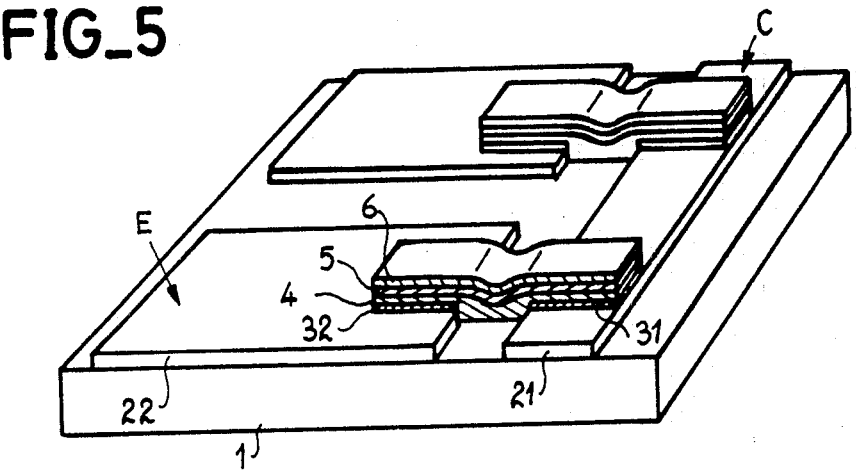
FIG_5
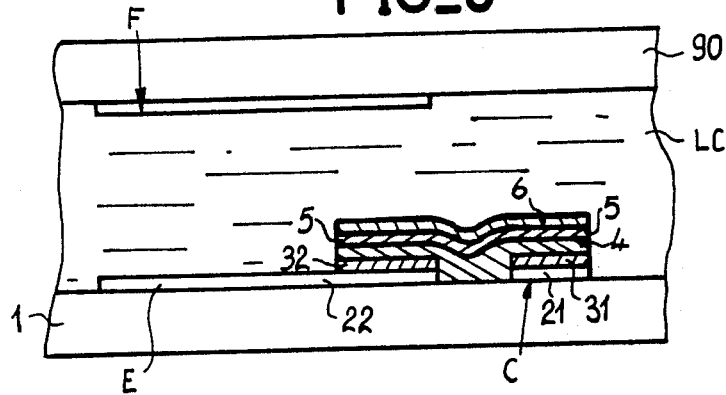
FIG_6

FIG_7
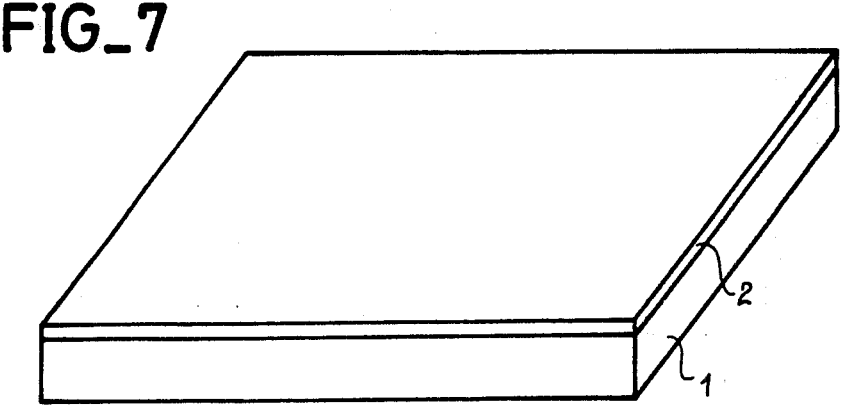
FIG_8
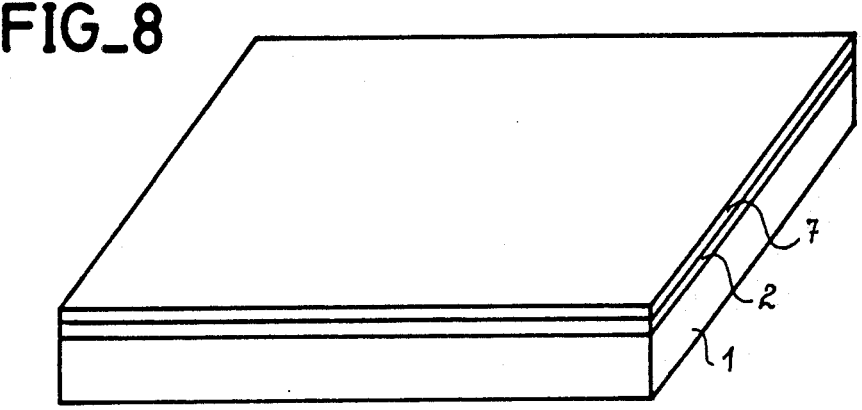
FIG_9
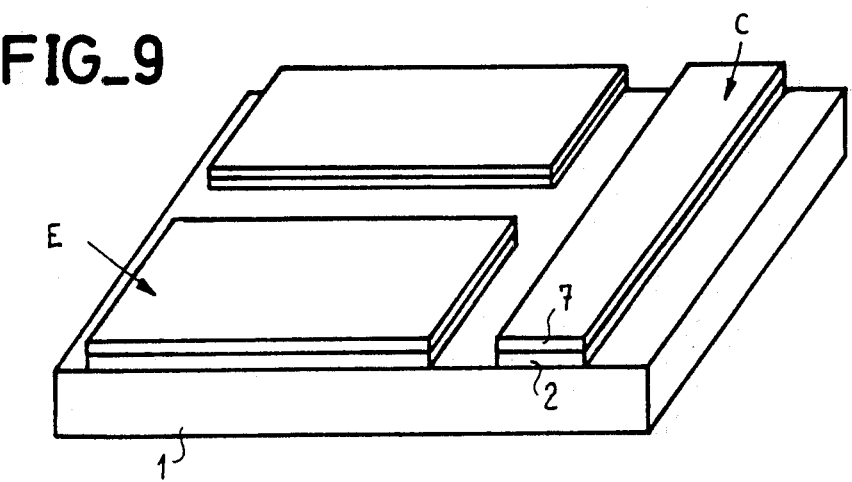

FIG_10
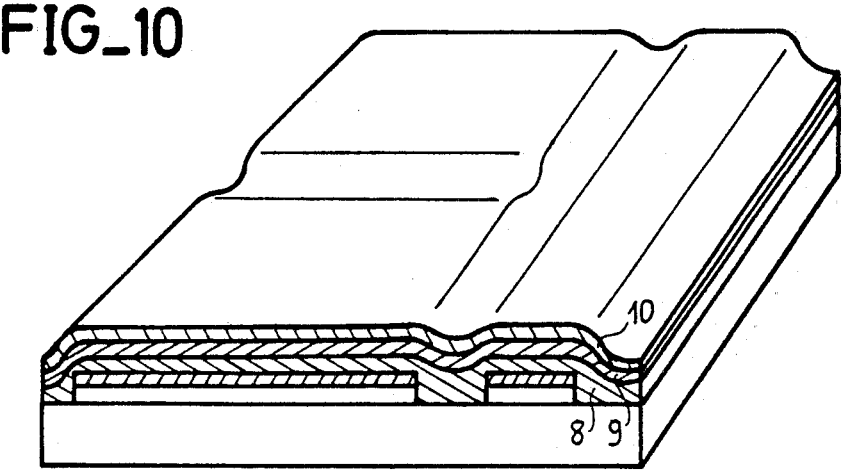
FIG_11
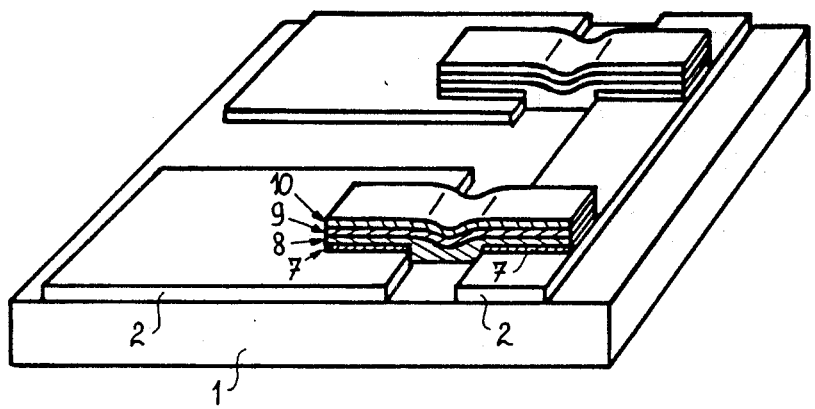
FIG_12
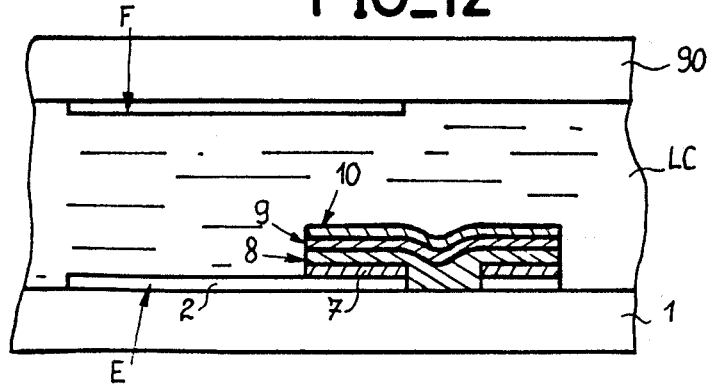

FIG_13
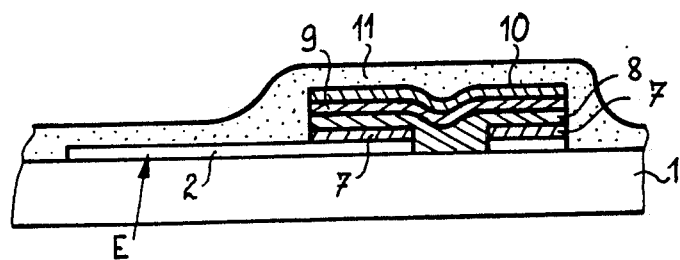
FIG_14
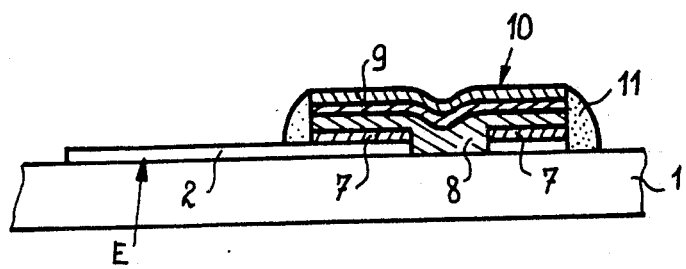

METHOD OF FABRICATION OF DIODE-TYPE CONTROL MATRICES FOR A FLAT ELECTROOPTICAL DISPLAY SCREEN AND A FLAT SCREEN CONSTRUCTED IN ACCORDANCE WITH SAID METHOD

BACKGROUND OF THE INVENTION

1. Field of the Invention

This invention relates to a method of fabrication of diode-type control matrices for a flat display screen, especially for a liquid-crystal display screen, and also to a flat screen fabricated in accordance with said method.

The present invention finds an application in the general field of large-area thin-film electronics and is more specifically applicable to integrated control of each elementary point of a liquid-crystal screen.

2. Description of the Prior Art

It is already known that liquid-crystal display screens usually have a large number of image points or elements of square or rectangular shape. These image elements can be addressed individually. The definition of the screen is a function of the number of points which are capable of receiving an item of information. Control of each point is performed by application of an electric field. For the purpose of visualizing video information, it has been proposed to provide matrix-type displays in which each image element is defined by the intersection of two orthogonal arrays of leads designated as rows and columns.

Addressing of an image element by means of control voltages applied to the row and to the column which relate to said element does not need to be maintained in the event of adoption of a time-multiplexing technique which permits refreshment of the state of the screen by recurrence. This technique is based on a persistence effect which may be either physiological or available within the screen element. In the case of liquid-crystal display devices, an image element can be assimilated with a capacitor in which the time constant is sufficient to maintain the charge between two successive transient addressing operations.

The performances of a matrix screen can be improved by mounting in series with the image element a non-linear resistor which is practically insulating at values below a threshold voltage but becomes increasingly conductive above said threshold voltage.

A non-linear element of this type can be of varistor material as described in French patent Application No. 81 16217 filed on Aug. 25th 1981 in the name of the present Applicant and published under No. 2,512,240 on Mar. 4th, 1983.

In the field of display screens, current technical requirements are primarily centered on the achievement of higher image definition. In the case of screens of the matrix display type, it is accordingly found necessary to design devices comprising a large number of addressing rows or columns which can amount to as many as 512 or even 1024. This entails a corresponding increase in the number of switching elements and therefore of varistors in the cited patent Application. For the purposes of large-scale production, it is necessary in particular to obtain good reproducibility and high stability of these components. Moreover, the electrical capacitance of the component must be matched with that of the associated cell, also with good reproducibility. In point of fact, however, these requirements cannot be fully satisfied by the materials commonly employed, such as agglomerates of zinc oxide powder containing particles of bismuth oxide and manganese oxide or similar material. The reproducibility and stability of varistors depend among other things on the grain size and on the techniques of passivation of the grain boundaries employed at the time of fabrication. The stray capacitance of the varistor which is also related to the grain boundaries cannot readily be controlled.

Other switching elements can be employed. Nevertheless, liquid-crystal display screens usually exhibit defective uniformity of contrast according to the image elements considered. Such defects are due to dispersion of the characteristics of the switching elements, which may be substantial and is difficult to eliminate on large areas. Although to a lesser extent, such defects may also arise from the thickness of the liquid crystal layer and from its bonding layer.

In order to overcome these disadvantages, devices are known in which the non-linear elements are thin-film transistors which mainly have a base of amorphous silicon or polycrystalline silicon. However, a certain number of difficulties are encountered in this type of technology and therefore have to be overcome if high-quality addressing is to be achieved. The solutions to be found must accordingly take into account the following considerations:

(1) better control of characteristics which depend on the properties of two layers (silicon and insulator) and of their interface;

(2) a self-alignment technology is necessary in order to achieve better reproducibility over a large area.

Other solutions contemplate the use of known non-linear dipole elements such as the structure having a base of two Schottky diodes mounted in series and in opposition. These diodes are semiconductor diodes which all have the same operating point in the current-voltage characteristic. Devices of this type are described in French patent Application No. 83 14542 filed by the present Applicant on Sept. 13th 1983 and are designed in particular in the form of Schottky diodes.

However, the practical application of this solution is subject to a few restrictive conditions:

the fabrication process involves four masking levels;

insulation of the flanks of the a-Si mesa is necessary, thus entailing the need for low-temperature deposition of insulating material (dielectric, polyimide) which must not only be of good quality but must also completely cover the flank;

the metallic contact connections of indium-tin oxide (ITO) on the Schottky gate metals are necessary for connection between said gates, the columns and the point electrodes;

although of low height, multilevels exist (height of mesa in particular) and there is a potential danger of failure of columns and of connections to the electrodes;

electrodes of indium-tin oxide (ITO) which are formed in the final step of the process can be annealed (in order to be made conductive) only at temperatures which are compatible with non-exodiffusion of the hydrogen contained in the amorphous silicon. The limit of 250°–280° C. is not usually sufficient for good annealing of ITO.

The present invention removes these different constraints and in fact offers the following advantages:

the method of fabrication in accordance with the invention requires only two masking levels and positioning of the masks does not entail any need for a high degree of accuracy;

the connections do not call for insulation of the mesa flanks by a dielectric;

it is not necessary to make contact connections by reservation;

the conductive columns and electrodes are perfectly coplanar;

there is no limit for annealing of ITO (or other semi-transparent compounds such as $In_2O_3$) apart from compatibility with the substrate employed.

The method applies to non-linear elements of the type consisting of Schottky diodes or top-to-tail pin-diodes fabricated on amorphous silicon.

SUMMARY OF THE INVENTION

The invention therefore relates to a method of fabrication of diode-type control matrices for a flat electro-optical display screen comprising a substrate provided with a flat face, the method being distinguished by the fact that it comprises the following steps:

deposition of a first layer of conductive material on the surface of the flat substrate face;

etching of the layer of conductive material in order to form the control electrodes of the display screen and the control leads;

deposition of an undoped amorphous semiconductor layer;

deposition of a doped amorphous semiconductor layer;

deposition of a second layer of conductive material;

etching of the different layers thus deposited down to the first layer of conductive material in order to form terminal areas for connecting the control leads to the control electrodes.

The invention further relates to a flat screen comprising first and second parallel plates and electro-optical material placed between said plates, those faces of the two plates which are in contact with the electro-optical material being provided with control electrodes and control leads, at least the first plate being transparent. The distinctive feature of the invention lies in the fact that the electrodes of the second plate are coupled to the control leads of the same plate by means of non-linear control elements constructed in accordance with the invention.

BRIEF DESCRIPTION OF THE DRAWINGS

Other features of the invention will be more apparent upon consideration of the following description and accompanying drawings, wherein:

FIGS. 1 to 6 illustrate one example of execution of the method in accordance with the invention in which the non-linear elements are Schottky diodes;

FIGS. 7 to 12 illustrate an alternative embodiment of the method in accordance with the invention in which the non-linear elements are pin diodes;

FIGS. 13 and 14 illustrate the passivation of the flanks of the linear elements in accordance with the invention.

DESCRIPTION OF THE PREFERRED EMBODIMENTS

One embodiment of the method in accordance with the invention as considered by way of example and illustrated in FIGS. 1 to 6 permits the formation of Schottky diodes on a substrate for the purpose of controlling a liquid-crystal display device.

Provision is made for a substrate plate 1 of electrically insulating material which can be a transparent plate such as glass in the case of utilization in a device for liquid-crystal display by transparency.

In a first step, a uniform layer of conductive and transparent material is deposited. This material can be a mixed indium-tin oxide (ITO) or an equivalent material ($In_2O_3$, $SnO_2$). This layer will have a thickness within the range of 500 to 1000 Angströms. Commercially available substrates coated with a layer of this type may also be employed. As shown in FIG. 1, provision is accordingly made for a substrate plate 1 coated with a layer 2 of transparent conductive material.

In a second step, metallic material such as platinum, molybdenum or palladium is deposited so as to form a layer 3. This deposition is performed by electron gun or by cathode sputtering and results in the formation of a layer having a thickness of a few hundred Angströms. This metallic layer will serve to constitute the gates of the Schottky diodes. As illustrated in FIG. 2, there is thus obtained a substrate 1 covered with a layer 2 of transparent conductive material and with a metallic layer 3.

In a third step as shown in FIG. 3, the two layers 2 and 3 deposited earlier are cut so as to form electrodes such as the electrode E and column leads such as the lead C by means of a known method of photolithography or by a plasma-etching process. Each of these methods calls for selective removal by means of masks for defining the contours of areas which must not be etched. As a result of masking, the electrodes E have a shape which is adapted to the type of display to be provided. Thus the most common shape will be either square or rectangular. The conductors or so-called leads of column C are in fact parallel strips interposed between columns of electrodes E. As shown in FIG. 3, there are thus formed on a substrate 1 electrodes E comprising a layer 22 of transparent conductive material and a metallic layer 32 as well as leads C comprising a layer 21 of transparent conductive material and a metallic layer 31.

A fourth step consists in depositing an undoped amorphous silicon layer designated by the reference 4 in FIG. 4. This operation can be performed by plasma-assisted deposition by the so-called glow-discharge process at a temperature of 250° C. or by vapor-phase epitaxy generally known as chemical vapor deposition (CVD). During deposition of the undoped amorphous silicon, the temperature can be progressively increased so as to obtain a decreasing profile of the incorporated hydrogen. It is also possible to adopt a method of low-pressure vapor-phase epitaxy known as low-pressure chemical vapor deposition (LPCVD) at approximately 550° C. The thickness of the layer thus obtained must be within the range of 2000 to 6000 Angströms.

A fifth step consists in depositing a layer 5 of phosphorus-doped amorphous silicon (n+ type layer). The method adopted for this deposition is the same as in the previous step. The thickness of the layer must be within the range of 1000 to 2000 Angströms. In the event of deposition by low-pressure vapor-phase epitaxy (LPCVD), provision must be made for post-hydrogenation of the silicon layer prior to deposition of the following metal layer.

In fact, during a sixth step, a metal layer 6 such as chromium or aluminum is deposited by Joule effect. Since amorphous silicon is photoconductive, the layer obtained must have a thickness of approximately 500

Angströms in order to serve as a light screen for the amorphous silicon layers.

On completion of the sixth step, there is obtained a component as shown in FIG. 4 with the electrodes E and the column lead C deposited on the substrate 1, this structure being completely covered by the three layers 4, 5 and 6 which have been successively deposited during the steps described earlier.

During a seventh step, mesa structures such as those shown in FIG. 5 are cut in the layers of material 31, 32, 4, 5 and 6 and serve to connect the electrodes E to the lead C. This cutting operation is performed after masking of the surfaces corresponding to the mesa structures by chemical etching process, by plasma etching process or any other known method which is suited to this technique and in such a manner as to avoid any attack on the layer 2 of transparent conductive material.

As illustrated in FIG. 5, each electrode E constituted by a region 22 of transparent conductive material is coupled with the lead C by means of two Schottky diodes mounted in opposition, said lead C being also formed of transparent conductive material. The two diodes have a common metallic gate constituted by the metal layer 6. Said diodes are then formed by an n+ doped silicon layer 5, followed by a layer 4 of undoped silicon and finally by a metal layer 31, 32.

In an eighth step, the entire structure is annealed at a temperature within the range of 250° to 280° C. under vacuum or in an inert gas atmosphere. The purpose of this annealing operation is to improve the current-voltage characteristics of the Schottky diodes by formation of a stable interface of platinum silicon.

A point worthy of note is that, in the seventh step described earlier, the etching process may not be performed on the metal layer 3 which had been deposited during the second step. The device can accordingly be utilized in the reflection mode and not in the transparent mode. It is even possible in this case to dispense with deposition of transparent conductive material, thereby eliminating the first step described in the foregoing.

As illustrated in FIG. 6, the component thus formed is coupled with a plate 90 which is adapted to carry electrodes F located opposite to electrodes E. A space provided between the electrodes E and F is filled with a liquid crystal LC. There is thus formed a liquid crystal cell controlled by means of a non-linear element which is formed by Schottky diodes in opposition.

Reference being made to FIGS. 7 to 12, an alternative embodiment of the method in accordance with the invention will now be described. This method is directed to the construction of non-linear control elements constituted by pin diodes or in other words diodes comprising successive semiconductor layers which are p+ doped, undoped and n+ doped.

In a first step of this alternative method, a layer 2 of conductive material is deposited on a substrate 1. This material can be transparent such as indium oxide ($In_2O_3$) for operation in an optical transmission mode. Said material can also be a metal (such as chromium, nickel-chromium alloy, aluminum) for operation in a reflection mode. The thickness of the layer must be within the range of 500 to 1000 Angstroms. The component shown in FIG. 7 is thus obtained.

A second step consists in depositing a layer 7 of p+ doped silicon. This deposition can be carried out either by plasma-assisted vapor-phase epitaxy also designated as chemical vapor deposition (CVD) or by low-pressure chemical vapor deposition (LPCVD). The thickness of this layer must be approximately within the range of 200 to 500 Angstroms.

During a third step, a chemical plasma-etching process, for example, is carried out on the two layers 2 and 7 in order to form electrodes E and column leads C. This construction therefore entails the need for masking of the layers of materials 2 and 7 to be retained. A component as shown in FIG. 9 is thus obtained.

A fourth step consists in depositing a layer 8 of undoped or lightly n-doped amorphous silicon. This deposition operation is performed by one of the methods described in the foregoing. The thickness of the layer described must be within the range of 3000 to 5000 Angstroms.

In a fifth step, there is deposited in the same manner a layer 9 of n+ type doped amorphous silicon having a thickness of approximately 200 Angstroms.

A sixth step consists in depositing a layer of metal 10 such as chromium, nickel-chromium or aluminum. This deposition is carried out by Joule effect and the thickness of the layer must be approximately 500 Angstroms in order to serve as a light screen for the layers which were deposited earlier.

Finally, during a seventh step, mesa structures are formed by chemical or plasma etching process. The four layers 7, 8, 9 and 10 are etched after having masked the portions to be retained.

There is thus obtained a device as shown in FIG. 11 in which an electrode E is coupled with a column lead C by means of two diodes in opposition. The two diodes have a common metal gate 10 and are provided successively with an $n^{30}$ doped amorphous silicon layer 9, an undoped amorphous silicon layer 8, a p+ doped amorphous silicon layer 7 and a layer 2 of conductive material.

A diode-type control device of this type can be employed in a liquid-crystal display cell as illustrated in FIG. 12 and constructed in the same manner as the liquid-crystal display cell of FIG. 6.

A point to be noted in the process described thus far is that, in the second step, the deposited silicon can be n+ doped. In this case, the silicon will be p+ doped instead of n+ doped during the fifth step. The diodes thus obtained will be reversed with respect to those illustrated in FIG. 11.

A liquid-crystal display device as shown in FIG. 12 is obtained in exactly the same manner as the device described with reference to FIG. 6 by associating a plate 90 having electrodes F with the plate 1 (provided with electrodes E, leads C and control elements) and by filling the space existing between the two plates 1 and 90 with a liquid crystal LC.

The technology of the flat-panel screen proper is well known to those versed in the art: anchoring layers, thickness controls, transparent counter-electrodes, introduction of the liquid crystal, and so on.

Moreover, the method in accordance with the invention can be completed as shown in FIGS. 13 and 14 by a step which consists in passivating the flanks of the mesa structures obtained in order to eliminate all harmful leakage currents which are liable to appear on the vertical surfaces of the mesas. This passivation is performed without any additional masking step by deposition of a dielectric over the entire plate 1 followed by an anisotropic plasma etch or so-called reactive-ion etching (RIE) process which allows the dielectric to remain only on the flanks of the mesas.

The passivation mentioned above can also be performed by deposition of a dielectric followed by a photoetching process involving a masking operation which does not call for critical accuracy.

The method of fabrication in accordance with the invention is well-suited to the fabrication of redundant structures. For example in the case of an image element defined in two half-points, each half-point has access to the control diode, thus minimizing the risk of faulty diode operation.

It is accordingly clear from the foregoing that the method in accordance with the invention permits the fabrication of diode-type non-linear control elements for liquid-crystal display screens. This method offers the advantages described in the introductory part of the foregoing description, of primary interest being the fact that it requires only two masking operations which in turn do not need to be performed with any particular degree of precision.

What is claimed is:

1. A method of fabrication of diode-type control matrices for a flat electrooptical display screen comprising a substrate provided with a flat face, comprising the following steps:
   - (step a) deposition of a first layer of conductive material on the surface of a flat substrate face;
   - (step b) etching of the layer of conductive material in order to form the control electrodes of the display screen and the control leads;
   - (step c) deposition of an undoped amorphous semiconductor layer;
   - (step d) deposition of a doped amorphous semiconductor layer;
   - (step e) deposition of a second layer of conductive material;
   - (step f) etching of the different layers thus deposited down to the first layer of conductive material in order to form terminal areas for connecting the control leads to the control electrodes.

2. A method according to claim 1, wherein the first step (a) comprises a step involving deposition of a layer of transparent conductive material followed by a step involving deposition of a metal layer, the object of the second step (b) being to permit etching of the two layers formed in the two preceding steps, the object of the final step (f) being to permit etching of the different layers down to but not including the layer of transparent conductive material.

3. A method according to claim 1, wherein the third step (c) involving deposition of an undoped amorphous semiconductor layer is performed with an increasing temperature gradient in order to obtain a decreasing hydrogen profile within said semiconductor layer as a function of the thickness of deposited material.

4. A method according to claim 1, wherein the material deposited during the first step (a) is a transparent conductive material.

5. A method according to claim 1, wherein the material deposited during the first step (a) is a metal.

6. A method according to claim 4 or claim 5, wherein provision is made between the first step (a) and the second step (b) for an additional step (a') involving deposition of a p+ doped semiconductor layer whilst the fourth step (d) permits deposition of an n+ doped semiconductor layer.

7. A method according to claim 4, comprising between the first step (a) and the second step (b) an additional step (a') involving deposition of an n+ doped semiconductor layer whilst the fourth step (d) permits deposition of a p+ doped semiconductor layer.

8. A method according to claim 1, wherein said method is completed by a final step involving passivation of the flanks of the terminal areas.

9. A flat-panel screen comprising a first plate and a second plate in parallel relation and electro-optical material placed between said plates, those faces of the two plates which are in contact with the electro-optical material being provided with control leads and electrodes, at least the first plate being transparent, wherein the electrodes of the second plate are coupled with the control leads of the same plate by means of nonlinear control elements formed in accordance with claim 1.

* * * * *